United States Patent [19]
Bedis et al.

[11] Patent Number: 4,579,394
[45] Date of Patent: Apr. 1, 1986

[54] SPLIT MASTER LINK FOR TRACK-LAYING VEHICLE TRACK

[75] Inventors: Michael Bedis; Carl L. Braun, both of Dubuque, Iowa; Robert J. DeMeester, East Dubuque, Ill.

[73] Assignee: Deere & Company, Moline, Ill.

[21] Appl. No.: 533,022

[22] Filed: Sep. 16, 1983

[51] Int. Cl.[4] .................. B62D 55/20; B62D 55/26
[52] U.S. Cl. ................................. 305/54; 305/58 R
[58] Field of Search ..................... 305/54, 58 R, 39

[56] References Cited
U.S. PATENT DOCUMENTS
4,365,848 12/1982 Grilli et al. ........................ 305/54

Primary Examiner—David A. Scherbel

[57] ABSTRACT

A split master link has first and second halves joined along a line of separation defined by toothed and ramp portions arranged such that a gap exists between the tips and roots of the mating teeth when fasteners holding the link halves together are loose. The gap dimension is chosen such that when the fasteners have been tightened to the extent necessary for establishing a desired prestressing of the links through the action of the ramp portions, the tips will have bottomed out. At this time, a significant portion of the desired clamping load will be available through further tightening of the fasteners for forcing the tips and roots together so as to establish a rigid, non-loosening joint.

3 Claims, 2 Drawing Figures

SPLIT MASTER LINK FOR TRACK-LAYING VEHICLE TRACK

BACKGROUND OF THE INVENTION

The present invention relates to a split master link of the type used in track-laying vehicle track and more particularly relates to a split master link designed so as to remain as a solidly clamped joint during operation once the bolts holding the link halves together are properly torqued.

It is known to make split master links in opposite halves having interengaged teeth or serrations and ramp portions, the teeth or serrations having flank portions at one side thereof which engage each other and are drawn together as a result of the action of the ramp portions upon tightening connection bolts holding the halves together. U.S. Pat. No. 3,096,661 granted to Reinsma et al on July 9, 1963 and U.S. Pat. No. 3,427,079 granted to Skromme et al on Feb. 11, 1969 are examples of such split master links.

One problem found with known split master link designs is that they tend to loosen and come apart or fail during operation. In fact, some equipment users have been known to weld the halves together to prevent the links from coming apart. However, this totally destroys the serviceability advantages for which the split link was first intended.

A characteristic of the known split master links having the loosening problem just described is that a large portion, if not all, of the clamp load exerted by the bolts goes into prestressing the link. It is believed that this results in a "springy" joint permitting the two halves to move relative to one another during operation to the extent that the bolts loosen.

U.S. Pat. No. 4,351,573 granted to Bedis et al on Sept. 28, 1982 illustrates a split master link which is designed such that critical areas adjacent the last tooth in the set of meshed teeth are properly prestressed for long life. It is with this split master link that the present invention is preferably used; however, it is felt that the principles of the invention may be advantageously applied to various different split master link designs.

SUMMARY OF THE INVENTION

According to the present invention there is provided a novel split master link.

It is an object of the invention to provide a split master link designed such that a non-loosening, solid joint exists when the bolts holding the link halves together are properly torqued.

More specifically, it is an object of the invention to provide split master link halves having ramp portions adjacent one or more teeth which mesh such that teeth flank portions are tightened against each other as the link is prestressed during an initial torquing of the bolts, the tooth tips then bottoming out on the mating root surfaces and being clamp-loaded thereagainst during final torquing of the bolts.

Yet a more specific object of the invention is to provide a split master link design wherein no more than about 60% of the clamp load is used in prestressing the link while the remaining clamp load is used to clamp the teeth tips and mating root surfaces together.

These and other objects will become apparent upon reading the ensuing description together with the appended drawing.

DESCRIPTION OF THE PREFERRED EMBODIMENT

Figure 1:
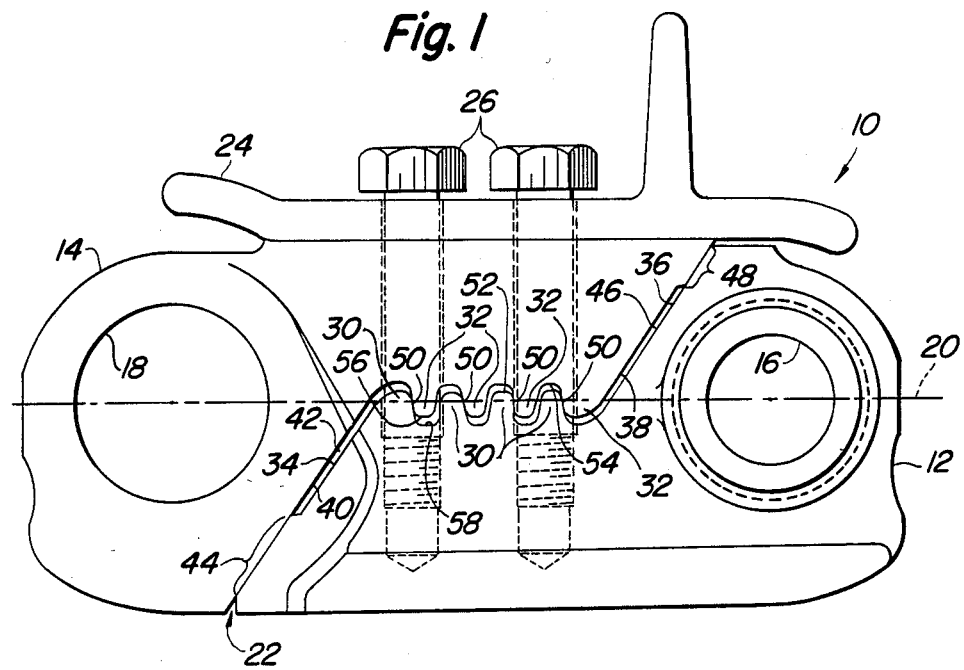
FIG. 1 is a side elevational view of a split master link showing the link halves in an unclamped condition.
Figure 2:
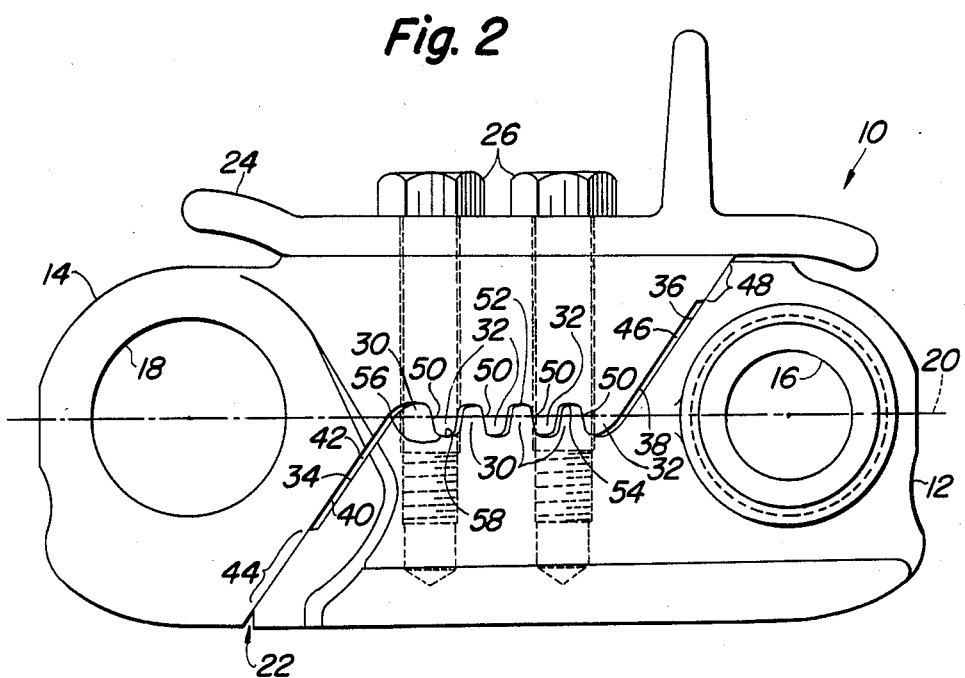
FIG. 2 is a view like FIG. 1 but with the link halves shown clamped together.

Referring now to FIGS. 1 and 2, therein is shown a track link 10 comprising first and second halves or sections 12 and 14, respectively. Provided in the opposite ends of the link 10 so as to be in the halves 12 and 14, respectively, are a pin bore 16 and a bushing bore 18. A line connecting the centers of the bores 16 and 18 is here shown at 20. The link halves 12 and 14 have overlapping portions located between the bores 16 and 18 and joined together along a separable joint indicated at 22. The link 10 includes an outer side having a track shoe 24 bolted thereto by a pair of bolts 26 which extend through the shoe and into connecting bores which extend downwardly in the link so as to pass through the link half 14 and terminate in the half 12.

The separable joint 22 is made up of confronting surfaces formed on the halves 12 and 14. Specifically, the half 12 includes a tooth rack or serrated surface portion defined by a plurality of teeth 30 located on the line of centers approximately halfway between the centers of the bores 16 and 18. The half 14 includes a similar tooth rack defined by a plurality of teeth 32.

The racks formed by the teeth 30 and 32 extend over approximately the central one-third of the distance between the centers of the bores 16 and 18. As viewed in the figures, a stepped inner ramp surface 34 forms a leftward continuation of the rack formed by the teeth 30 while a planar outer ramp surface 36 forms a rightward continuation of the rack. Similarly, a stepped outer ramp surface 38 forms a rightward continuation of the rack formed by the teeth 32 while a planar inner ramp surface 40 forms a leftward continuation of the rack. The stepped surface 34 and the planar surface 40 are disposed in confronting relationship to each other so as to define an inner space or relief area 42 which extends from the teeth 30 and 32 towards the inner side of the link over a distance equal to approximately three-fourths of the length of the planar surface 40. The stepped inner surface 34 abuts against the remaining quarter of the length of the planar surface 40 and cooperates to define an inner bearing area 44. Similarly, the outer planar ramp surface 36 is disposed in confronting relationship to the stepped outer ramp surface 38 so as to define a relief or space 46 and an outer bearing area 48.

The teeth 30 and 32 have respective right- and left-hand flank surfaces which are engaged with each other, as at locations 50. The teeth 30 and 32 are located relative to each other such that as the halves 12 and 14 are brought together with the fasteners 26 in a loose condition, as shown in FIG. 1, the confronting flank surfaces become engaged in an unloaded condition while the tips 52 of the teeth 30 are spaced from confronting roots 54 of the teeth 32 and the tips 56 of the teeth 32 are spaced from confronting roots 58 of the teeth 30.

As bolt clamp load is applied, the link is elastically deformed due to the wedging action effected against the flank surface locations 50 by the ramp surfaces 36 and 40 at the bearing areas 44 and 48. In this way, the link is prestressed. Also, as the bolts are tightened, each tooth deflects due to the wedging force, and as they deflect, the tooth tips 52 and 56 respectively move towards the roots 54 and 58. In the embodiment shown, the tooth tips will bottom out against the roots when 20 to 30 percent of the desired clamp load has been applied. All of the prestressing of the link will have been accomplished at this point. The amount of initial gap between the tooth tips and opposing roots is established based on the optimum amount of prestress required for optimum fatigue life. The remaining 70 to 80 percent of the clamp load is applied after the teeth have bottomed out and is transferred directly from the tooth tips to the roots of the mating link. This direct transfer results in a very solid joint, allows for proper bolt stretch, and significantly increases the resistance to loosening.

It is thought that split master link designs having tooth arrangements different from those illustrated herein could benefit from applicants' concept of bottoming out the teeth by applying a clamp load sufficient to adequately prestress the link and thereby applying the remaining desired clamp load even if up to 60 percent of the desired clamp load is used in prestressing the link.

We claim:

1. In an endless track split master link including first and second separable link sections with the first section having at least one tooth having a flank surface engaged with a first surface of the second section and having a tip disposed in confronting relationship to a second surface of the second section, and with the first and second sections further having confronting ramp surfaces for effecting a desired prestress in the link when the sections are clamped together, and fasteners for releasably clamping the first and second sections together with a predetermined clamp load, the improvement comprising: said tooth being configured and arranged relative to said first surface such that when the fasteners are in a loose condition, the flank surface is in engagement with but not loaded against the first surface and the tip surface is spaced from said second surface by an amount which will result in the tip engaging the second surface upon no more than about 60 percent of the predetermined clamp load being effected.

2. The split master link defined in claim 1 wherein said first and second sections include a plurality of teeth having respective tips disposed in confronting relationship to respective roots and wherein the teeth are configured and arranged relative to one another such that the tips are spaced from respective roots when the fasteners are in a loose condition by an amount which will result in the tips engaging the respective roots upon the fasteners being tightened to establish no more than about 60 percent of the desired clamp load and adequate prestress in the link.

3. In a split master link including first and second halves respectively having pin and bushing bores extending therethrough, a rack of teeth formed on each link half with the teeth being meshed along a line of centers passing through the pin and bushing bores, with flanks of the teeth of one half engaging respective flanks of the teeth of the other half, confronting ramp surfaces respectively forming continuations at opposite ends of the racks of teeth of the link halves with the surfaces being angled such that the link is prestressed a preselected amount when its halves are clamped together and releasable fasteners for releasably clamping the link halves together, the improvement comprising: the teeth of each half having a tip confronting a root of the other half and the tips being spaced from the confronting roots by a preselected distance when the fasteners are loose and confronting flank surfaces of the teeth of the first and second halves are engaged with but not loaded against each other, with the distance being determined so that the tips will bottom on the roots when the fasteners have been tightened to establish 20 to 30 percent of the desired clamp load holding the links together and will transfer the remaining 70 to 80 percent of the clamp load to the roots upon completing the tightening of the fasteners.

* * * * *